Figure 4:
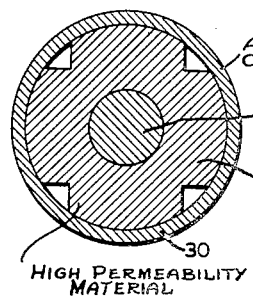

April 3, 1951  H. C. ROTERS  2,547,599
HYSTERESIS DYNAMOELECTRIC MACHINE
Filed Oct. 31, 1945  2 Sheets-Sheet 1
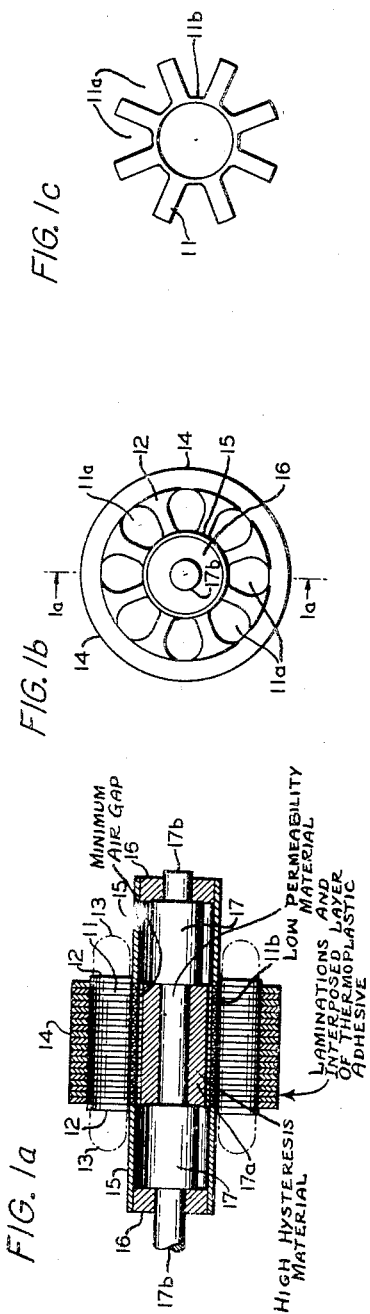
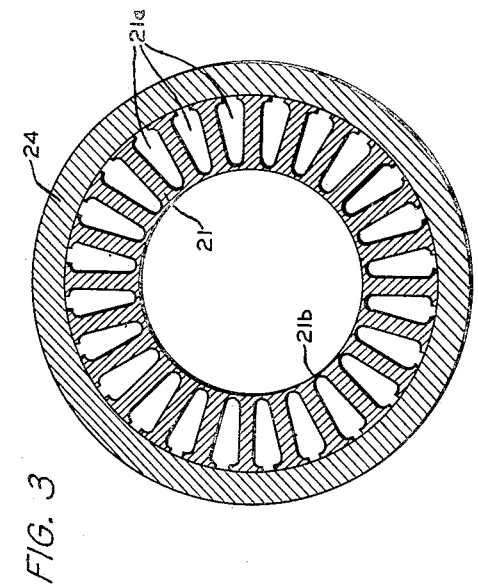
INVENTOR
HERBERT C. ROTERS
BY Mueller, Dodds & Mason
ATTORNEY April 3, 1951  H. C. ROTERS  2,547,599
HYSTERESIS DYNAMOELECTRIC MACHINE
Filed Oct. 31, 1945  2 Sheets-Sheet 2

INVENTOR
HERBERT C. ROTERS
BY Mueller, Dodds & Mason
ATTORNEY

Patented Apr. 3, 1951

2,547,599

UNITED STATES PATENT OFFICE 2,547,599

HYSTERESIS DYNAMOELECTRIC MACHINE

Herbert C. Roters, Kew Gardens, N. Y., assignor, by mesne assignments, to Casner Patents, Inc., New York, N. Y., a corporation of New York Application October 31, 1945, Serial No. 625,878

17 Claims. (Cl. 318—166)

This invention relates to hysteresis dynamoelectric machines and, while it is of general application, it is especially adapted to fractional horsepower self-starting hysteresis motors of the synchronous and control or torque motor types. This application is a continuation-in-part of my copending application, Serial No. 521,650, filed February 9, 1944, entitled "Alternating-Current Dynamoelectric Machine," now Patent 2,423,345, July 8, 1947, and assigned to the same assignee as the present application.

Fractional horsepower motors have a wide range of application in industrial and domestic appliances. In the past these motors have generally been of the direct-current or universal commutated-armature type or of the induction or synchronous types with distributed polyphase armature windings. The former type has the disadvantages of all commutator machines, namely, they are subject to wear and misadjustment of the commutator brushes and sparking at the commutator with the resultant wear and possible short circuiting of the commutator. In addition, they create troublesome high-frequency interference which is disturbing to radios and other domestic appliances. The latter type of prior art motor has had the disadvantage that, for a given power output, it has been of relatively large volume and weight and has been subject to high cost of manufacture, particularly in forming and placing the polyphase distributed winding. For example, in these small motors of the alternating-current type with internal slots, it has been customary to wind the coil in the open slots of the stator one turn at a time by threading the wire through the stator tunnel with a winding gun or by preforming the coil outside of the machine and inserting it in the slots one conductor at a time.

When such motors are operated as synchronous motors, it is important that they have a high synchronizing torque, since this parameter determines the maximum load which the motor can pull into synchronism, which is usually the limiting factor on synchronous motors.

On the other hand, in control motors or torque motors, it is customary to excite one phase winding continuously at substantially the rated voltage and to excite another phase winding with a control current of variable phase or of constant phase displacement and variable amplitude. It is essential that such motors have maximum sensitivity to energization of their control winding by control currents of relatively small phase displacement or of relatively small amplitude, or both, and that such sensitivity be substantially uniform in all positions of the motor rotor.

In Patent No. 2,328,743, granted September 7, 1943, on my application and entitled "Self-Starting Hysteresis Motor," there is disclosed and claimed a self-starting hysteresis synchronous motor adapted for construction in fractional horse-power sizes by which the volume and weight of the motor for a given horsepower output may be substantially reduced. The present invention when applied to a motor of the type disclosed in the aforesaid patent provides an improved motor of such type which avoids both the use of a commutated armature and the forming and placing of the motor winding in a small armature tunnel, with the attendant disadvantages noted above, and which has maximum synchronizing torque when embodied in a motor to be operated synchronously and maximum and uniform sensitivity when operated as a control or torque motor.

It is an object of the invention, therefore, to provide a new and improved self-starting hysteresis dynamoelectric machine of improved and simplified construction resulting in a minimum size and cost for a given power rating.

It is another object of the invention to provide a new and improved self-starting hysteresis motor which is suitable for operation synchronously with maximum synchronizing torque.

It is another object of the invention to provide a new and improved self-starting hysteresis motor suitable for operation as a control or torque motor and having maximum sensitivity to controlling excitation which is uniform for all rotor positions.

In accordance with the invention, a self-starting hysteresis dynamoelectric machine includes cooperating stator and rotor members, one of the members comprising a magnetic core structure having a low conductivity to eddy currents and having a series of radially extending, angularly spaced winding slots and magnetic bridges for the ends thereof adjacent the other member and a polyphase distributed energizing winding disposed in the winding slots. The other of the members comprises a magnetic armature constructed at least in part of a magnetic material having a high hysteretic constant and the members have complementary cylindrical adjacent surfaces forming an air gap therebetween and have such relative diameters that the air gap is substantially the minimum permitted by manufacturing tolerances. The motor is further provided with means for mounting the members for relative rotation. The term "cylindrical surface"

is used herein and in the appended claims to refer to surfaces of the type which is not necessarily a complete circular cylinder but which may be in the form of a salient pole surface the major portion of which comprises segmental cylindrical surfaces.

In accordance with one embodiment of the invention, a self-starting hysteresis motor comprises a stack of electrically insulated annular core laminations and one or more supporting bearing plates with external radial winding slots and a layer of thermoplastic adhesive material interposed between adjacent laminations and between such laminations and the end plates and constituting means for securing the laminations and plates together without substantially impairing their insulation to form a unitary core structure. This unitary core structure is provided with a polyphase distributed energizing winding disposed in the external winding slots and a magnetic yoke is disposed about the core structure and the winding. A supporting bearing is mounted from and supported solely by each of the end plates and there is provided a cooperating rotor having a smooth cylindrical surface and disposed within the bore of the core structure and supported in the bearings and constructed at least in part of a magnetic material having a high hysteretic constant. In a preferred form of the invention the rotor is in the form of an annular shell of material having a high hysteretic constant and a central salient-pole core structure of high-permeability material.

By the term "external slots" as used herein and in the appended claims is meant a slot which is open at the outer periphery of the magnetic core structure and is closed at the inner periphery thereof by a magnetic bridge.

For a better understanding of the invention, together with other and further objects thereof, reference is had to the following description taken in connection with the accompanying drawings while its scope will be pointed out in the appended claims.

Figure 6:
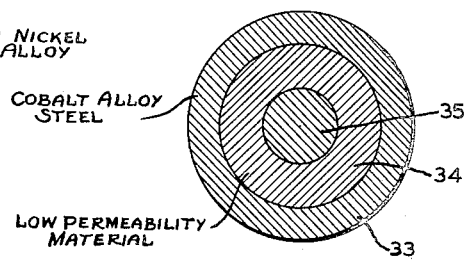
Figure 5:
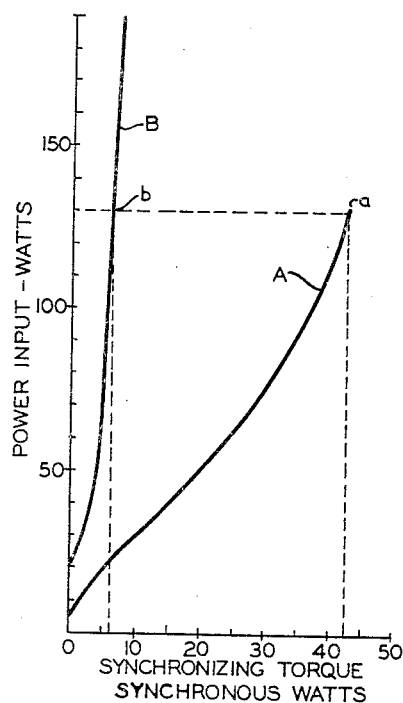
Figure 7:
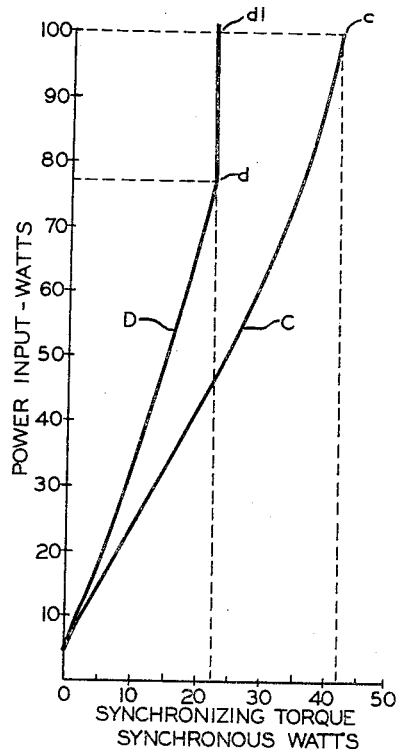

Referring now to the drawings, Fig. 1a is a longitudinal sectional view and Fig. 1b an end view of an improved dynamoelectric machine structure embodying the invention with the winding omitted from Fig. 1b for the sake of clarity; Fig. 1c is a view of a modified form of core lamination; Fig. 2 is a schematic circuit diagram illustrating the method of connection of the windings of the motor of Figs. 1a and 1b; Fig. 3 is a cross-sectional view of a stator structure similar to that of Fig. 1a but slightly modified in detail; Fig. 4 is a cross-sectional view of a rotor designed to operate with the stator of Fig. 3; Fig. 6 is a cross-sectional view of a modified form of rotor designed to operate with the stator of Fig. 3; while Figs. 5 and 7 are graphs representing operating characteristics of a motor embodying the invention and comprising the stator of Fig. 3 and the rotors of Figs. 4 and 6, respectively.

Referring now to Figs. 1a, 1b and 1c of the drawings, there is represented a hysteresis dynamoelectric machine embodying the invention, which is preferably constructed in accordance with the method described in my aforesaid copending application Serial No. 521,650, or my copending application Serial No. 580,904, filed March 3, 1945, entitled "Method of Manufacturing Dynamoelectric Machines," now Patent 2,483,024, September 27, 1949, both assigned to the same assignee as the present application.

This dynamoelectric machine comprises cooperating stator and rotor members. One of the members, for example the stator member, comprises a magnetic core structure including a stack of electrically insulated annular core laminations 11 and supporting end plates 12, 12 and having a smooth continuous cylindrical bore therethrough. A layer of thermo-plastic or thermo-setting adhesive material is interposed between the adjacent laminations and between the laminations and end plates, as by dipping them in a bath of such adhesive material, and such adhesive material constitutes means for securing the laminations and the end plates together to form a unitary magnetic core structure without substantially impairing their insulation so that the structure has a low conductivity to eddy currents. The adhesive material used for this purpose may be a polyvinyl-butyral resin or phenolic modification thereof or a copolymer of vinyl acetate and vinyl chloride and commercially available as "Du Pont 4624," "Du Pont 4631," "Cordo Adhesive" and "Bostik"; or it may be furfural resin commercially available as "Cycleweld Cement."

Each of the core laminations 11 has a series of external radially-extending, angularly spaced winding slots 11a. The unitary core structure also has a series of magnetic bridges for the ends of the winding slots 11a adjacent the rotor; specifically the core laminations 11 are formed with a continuous inner bridge ring 11b. A conventional polyphase distributed energizing winding 13 is disposed in the external winding slots 11a (omitted in Fig. 1b for the sake of clarity) and may comprise any desired winding pattern. The motor also comprises an annular magnetic yoke 14 disposed about the unitary core structure. This yoke may comprise a series of annular laminations surrounding the core structure and the winding 13. Mounted on the end plates 12, 12 and supported solely thereby are a pair of hubs or sleeves 15, 15 which can be attached to the end plates by welding, brazing, or like process.

Alternatively the stator member comprising the stack of laminations 11, the end plates 12, the winding 13 and the yoke 14 may be assembled, as described, on a mandrel and, while so mounted, impregnated with a suitable insulating varnish or other compound and baked. With such an assembly process, the insulating varnish forms a layer of thermosetting adhesive between adjacent laminations and between the laminations and the end plates and serves with the winding 13 and yoke 14 to form a rigid unitary stator structure.

The rotor 17 comprises a magnetic armature constructed at least in part of a magnetic material having a high hysteretic constant. The motor also includes means for mounting the stator and rotor members for relative rotation; for example within the ends of the sleeves 15 are mounted bearings 16, 16 from which is supported the rotor 17 which is disposed within the bore of the annular core structure, as indicated.

The unitary stator core structure described and the rotor 17 are constructed with complementary smooth continuous cylindrical adjacent surfaces forming an air gap therebetween and with such relative diameters that such air gap is substantially the minimum permitted by manufacturing tolerances. The motor structure as thus constructed may be inserted in any suitable protective housing (not shown) which may serve also to carry the winding terminals.

The armature teeth separating the radial external slots 11a are shown flared at the outer radius in order to provide a path of greater permeance for the flux between the core teeth and the yoke. However, if the fit between these parts is sufficiently close, this flare may be eliminated by constructing the teeth as straight radial spokes, thereby providing a greater winding space, as illustrated in Fig. 1c.

With the dynamoelectric machine construction of the invention, it is possible to provide a multiple slot winding with each winding spanning several teeth. For example, in Fig. 2 there is represented schematically a circuit diagram of a two-phase motor constructed as described above having eight winding slots and eight windings, 1–8, inclusive. As indicated, windings 1, 2, 6 and 5, respectively, are connected directly across the supply terminals 18, while the windings 3, 4, 8 and 7, respectively, are connected across the supply terminals 18 through a phase-shifting condenser 19 to provide a uniform rotating magnetic field. The several windings are disposed in the slots indicated in the following table:

| Winding | Slots |
| --- | --- |
| 1 | 1 and 4 |
| 2 | 2 and 5 |
| 3 | 3 and 6 |
| 4 | 4 and 7 |
| 5 | 5 and 8 |
| 6 | 6 and 1 |
| 7 | 7 and 2 |
| 8 | 8 and 3 |

Certain modifications of the structure described above may be made while still realizing substantially the advantages enumerated above. For example, the stack of laminations 11 and end plates 12 may be held together by rivets, provided that they and the end plates are formed of high resistivity material to minimize eddy currents. Further the rotor 17 and its bearings 16, 16 may be mounted from the protective housing, in case one is provided, instead of from the end plates 12, 12 as described. Also, while the stator laminations are shown as having eight winding slots and the motor wound as a two-phase eight-winding motor, it will be apparent that the number of winding slots may be any number appropriate to the type of winding and the number of poles and phases required.

The rotor of the invention may take a variety of forms such as illustrated and described in aforesaid Patent 2,328,743. The rotor of Figs. 1a and 1b is illustrated as being constructed in the form of an annular shell 17a of a material having a high hysteretic constant, such as an aluminium-nickel-cobalt alloy commercially available as "Alnico," surrounding a central portion 17b of low-permeability or non-magnetic material, such as stainless steel, which also serves as the motor shaft. The rotor including the portion 17b may be milled from a single rod, the portion 17a being cast in an annular recess formed therein, or the portion 17a and the end hubs of the rotor 17 may be formed separately and assembled in any suitable fashion on a continuous shaft of the size of the portion 17b.

In Fig. 3 is illustrated a stator structure having the same general constructional features of that of Figs. 1a and 1b but having different proportions suitable for a specific design described in detail hereinafter. The stator of Fig. 3 comprises a stack of electrically insulated annular core laminations 21 and may include end plates and bearing sleeves similar to the plates 12 and bearing sleeves 15 of the structure of Figs. 1a and 1b. Each of the core laminations 21 has a series of external radially extending winding slots 21a and is formed with a continuous inner magnetic bridge ring 21b. Any suitable polyphase distributed winding, not shown, is disposed in the winding slots 21a and the whole is surrounded with a magnetic yoke 24 which may itself comprise a stack of annular laminations closely fitting about the inner stack comprising the laminations 21. The stator structure of Fig. 3 corresponds closely to the actual physical construction of one hysteresis motor embodying the invention.

A modified form of rotor is represented in Fig. 4. This rotor comprises a relatively thin annular shell 30 of a material having a high hysteretic constant, for example an aluminum-nickel-cobalt alloy, and a central salient-pole core 31 of high-permeability material, for example an SAE–1112 steel. The core 31 is illustrated as a four-pole structure although it will be obvious that it may be constructed with any number of poles to correspond to the number of electrical poles of the stator. The rotor also includes a supporting shaft 32 of wear-resistant material, such as stainless steel, extending centrally through the core 31.

In Fig. 6 is illustrated a further modified form of rotor comprising a relatively thick annular shell 33 of material having a high hysteretic constant, such as a cobalt alloy steel, and a central core 34 of low-permeability or non-magnetic material, such as aluminum. This rotor is provided with a shaft 35 which may be similar to that of the rotor of Fig. 4, namely, stainless steel.

While the design constants of the dynamoelectric machine of the invention may vary widely in accordance with the installation and performance requirements, there follow by way of example only the design constants of the stator of Fig. 3 and the rotors of Figs. 4 and 6 designed to work therewith as a self-starting hysteresis motor:

*Stator of Fig. 3*

Annular laminations 21, 26 gauge dynamoelectric grade steel
    Outer diameter, 2.875 inches
    Inner diameter, 1.750 inches
    Bridge thickness, 0.025 inch
    24 slots.
    Winding, 4 pole, 2 phase, 75 turns per coil of No. 27 double Formex; coil pitch 4 slots; 3 coils per phase group, 2 series phase groups per phase winding, opposite phase windings in parallel.

*Rotor of Fig. 4*

Shell 30, "Alnico II"
    Outer diameter, 1.744 inches
    Inner diameter, 1.552 inches
Core 31, SAE 1112 steel
    Outer diameter, 1.552 inches
    Pole width, 0.875 inch
    Inner diameter, 0.562 inch
Air gap, 0.003 inch

*Rotor of Fig. 6*

Shell 33, Laminated magnet steel—18% cobalt; 5% tungsten; 4% chromium; 0.75% carbon; balance, iron.
    Outer diameter, 1.7398 inches
    Inner diameter, 1.250 inches Core 34, Aluminum
  Outer diameter, 1.250 inches
  Inner diameter, 0.562 inch
Air gap, 0.0051 inch It is a common feature of the hysteresis dynamoelectric machines comprising the stators of Figs. 1a, 1b or Fig. 3 and the rotors of Figs. 1a, 1b, Fig. 3 or Fig. 4 that the closed inner ends of the winding slots greatly reduce the parasitic hysteresis losses in the rotor otherwise occasioned by the pulsation in the flux produced by the open slots between the rotor teeth. With this construction it is preferable to reduce the air gap of the dynamoelectric machine to the minimum value allowed by manufacturing tolerances or other mechanical considerations. The radial thickness of the magnetic bridge at the inner ends of the winding slots is preferably made as small as consistent with structural rigidity. This construction is to be compared with that described in aforesaid Patent 2,328,743 involving a stator with open slots. As brought out in that patent, the construction illustrated and described therein is characterized by the fact that there is an optimum air gap corresponding to the value at which, for further increases in air gap, the rate of increase of the copper losses due to increased exciting current is equal to the rate of decrease of parasitic hysteresis losses due to the tooth harmonics.

The power input-synchronizing torque characteristic of a motor comprising the stator of Fig. 3 and the rotor of Fig. 4 is represented by curve A of Fig. 5 from which it is seen that, over the range of data represented by the curve, the synchronizing torque increases continuously and at a substantial rate with power input. At the point $a$ of curve A, for a power input of 130 watts the synchronizing torque is 42 synchronous watts. Curve B of Fig. 5 represents a motor identical to that of curve A except that the stator bridge ring of Fig. 3 is milled out to form slots 0.094 inch in width; that is to leave the inner ends of the winding slots substantially open in accordance with conventional design. It is seen that, for all values of power input, the synchronizing torque is a minor fraction of that of the motor embodying the invention. For example, at a power input of 130 watts, the synchronizing torque is only 5.7 synchronous watts. That is by the use of invention, the synchronizing torque is increased by a factor greater than 7. It is further to be noted from curve B that it becomes nearly asymptotic to the power input axis for large values of power input so that further increases of power input do not increase the synchronizing torque appreciably. As is understood by those skilled in the art, the synchronizing torque of a self-starting synchronous motor is an accepted factor of merit of the motor, as it represents the limiting load which the motor is able to synchronize, which is usually less than the pull-out torque, that is the load which the motor will carry without pulling out of synchronism; this is particularly true of motors having an effective salient-pole rotor construction, such as the rotor of Fig. 4.

In Fig. 6, curve C represents the power input-synchronizing torque of a motor comprising the stator of Fig. 3 and the rotor of Fig. 6, while curve D represents the corresponding characteristic of a motor comprising the stator of Fig. 3 with the slots milled, as described above, and the rotor of Fig. 6. It is seen that, for all values of power input, the synchronizing torque of the motor embodying the invention is substantially greater than that of a motor comprising the prior art stator with winding slots. With this motor it was found that the limiting synchronizing torque was that at point $d$ of curve D corresponding to a power input of approximately 77 watts, at which the motor developed a synchronizing torque of 22 synchronous watts. Irrespective of how much the power input to the motor was increased, it still failed to synchronize for torques in excess of 22 synchronous watts. On the other hand, the motor embodying the invention had the characteristic of increasing synchronizing torque for all values of power input up to a value several times the rated capacity of the motor windings. For example, at a power input of 100 watts, the motor developed a synchronizing torque of 42.5 synchronous watts, approximately twice the synchronizing torque developed by a motor with conventional stator slots.

Thus by the construction of the invention there is provided a self-starting hysteresis synchronous motor having a synchronizing torque of a higher order of magnitude than that of prior art motors of the same type. It has been found that this characteristic also increases the sensitivity of the motor to control currents of relatively small phase-displacement or relatively small amplitude, or both, when the motor is operated as a control or torque motor below synchronous speed. Furthermore, the smooth adjacent cylindrical surfaces of the stator and motor impart to the motor a virtually absolute uniform sensitivity in all rotor positions and increase the efficiency of the machine due to a reduction in windage losses.

The hysteresis dynamoelectric machine of the invention has a number of corollary advantages in addition to its improved electrical performance. Due to the smooth continuous adjacent cylindrical surfaces of the stator and rotor, it is exceptionally quiet in operation, which is important in certain installations, such as in a driving motor for a sound-translating apparatus. Further it permits the stator of a small non-commutated alternating-current machine to be wound in a conventional armature winding machine, thus avoiding the difficult hand winding in a small tunnel of an armature with internal winding slots. In addition, the bearings are supported directly from the core structure, whereby it constitutes a completely self-supported, self-contained motor requiring no supporting housing. The motor may be supported from its stator or from either or both bearings. Also, with this structure there are no limitations as to the number of winding slots that can be provided, as there is no mechanical interference between the several motor windings. In the construction of Figs. 1a and 1b there is an added advantage that the armature tunnel and the bearing sleeves 15, 15 may be bored to the same diameter in one operation, ensuring a high degree of concentricity between the armature and rotor without expensive machining operations, permitting the use of the minimum air gap and ensuring maximum magnetic efficiency and a maximum torque and power output for any given size of motor.

While there have been described what are at present considered to be the preferred embodiments of the invention, it will be apparent to those skilled in the art that various changes and modifications may be made therein without departing from the spirit or scope of the invention.

I claim:

1. A hysteresis dynamoelectric machine including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature constructed at least in part of a magnetic material having a high hysteretic constant, said members having complementary cylindrical adjacent surfaces forming an air gap therebetween and having such relative diameters that said air gap is substantially the minimum permitted by manufacturing tolerances, and means for mounting said members for relative rotation.

2. A hysteresis dynamoelectric machine including, cooperating stator and rotor members, one of said members comprising a magnetic core structure having a low conductivity to eddy currents and having a series of external radially extending winding slots and a continuous inner bridge ring and a polyphase distributed energizing winding disposed in said slots, the other of said members comprising a magnetic armature constructed at least in part of a magnetic material having a high hysteretic constant, said members having complementary cylindrical adjacent surfaces forming an air gap therebetween and having such relative diameters that said air gap is substantially the minimum permitted by manufacturing tolerances, and means for mounting said members for relative rotation.

3. A hysteresis dynamoelectric machine including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature including an annular shell of a magnetic material having a high hysteretic constant, said members having complementary cylindrical adjacent surfaces forming an air gap therebetween and having such relative diameters that said air gap is substantially the minimum permitted by manufacturing tolerances, and means for mounting said members for relative rotation.

4. A hysteresis dynamoelectric machine including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature including an annular shell of a magnetic material having a high hysteretic constant and a central salient-pole core of high-permeability material, said members having complementary cylindrical adjacent surfaces forming an air gap therebetween and having such relative diameters that said air gap is substantially the minimum permitted by manufacturing tolerances, and means for mounting said members for relative rotation.

5. A hysteresis dynamoelectric machine including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature including a relatively thin annular shell of a magnetic material having a high hysteretic constant and a central salient-pole core of high-permeability material, said members having complementary cylindrical adjacent surfaces forming an air gap therebetween and having such relative diameters that said air gap is substantially the minimum permitted by manufacturing tolerances, and means for mounting said members for relative rotation.

6. A hysteresis dynamoelectric machine including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature including a relatively thick annular shell of a magnetic material having a high hysteretic constant and a central core of low-permeability material, said members having complementary cylindrical adjacent surfaces forming an air gap therebetween and having such relative diameters that said air gap is substantially the minimum permitted by manufacturing tolerances, and means for mounting said members for relative rotation.

7. A hysteresis dynamoelectric machine including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature constructed at least in part of a magnetic material having a high hysteretic constant, said members having complementary smooth continuous cylindrical adjacent surfaces forming an air gap therebetween and having such relative diameters that said air gap is substantially the minimum permitted by manufacturing tolerances, and means for mounting said members for relative rotation.

8. A hysteresis dynamoelectric machine including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature including an annular shell of a magnetic material having a high hysteretic constant, a supporting shaft of wear-resistant material extending centrally through said central core, said members having complementary cylindrical adjacent surfaces forming an air gap therebetween and having such relative diameters that said air gap is substantially the minimum permitted by manufacturing tolerances, and means for mounting said members for relative rotation.

9. A hysteresis dynamoelectric machine including, cooperating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature including a relatively thick annular shell of a magnetic material having a high hysteretic constant and a central core of low-permeability material, a supporting shaft of wear-resistant material extending centrally through said central core, said members having complementary cylindrical adjacent surfaces forming an air gap therebetween and having such relative diameters that said air gap is substantially the minimum permitted by manufacturing tolerances, and means for mounting said members for relative rotation.

10. A hysteresis dynamoelectric machine including, cooperating stator and rotor members, said stator member comprising a magnetic core structure having a low conductivity to eddy currents and having a series of external radially extending, angularly spaced winding slots and an inner continuous magnetic bridge and a polyphase distributed energizing winding disposed in said slots, a magnetic yoke surrounding said core structure and winding, said rotor member comprising a magnetic armature constructed at least in part of a magnetic material having a high hysteretic constant, said members having complementary cylindrical adjacent surfaces forming an air gap therebetween and having such relative diameters that said air gap is substantially the minimum permitted by manufacturing tolerances, and means for mounting said members for relative rotation.

11. A self-starting hysteresis synchronous motor comprising a stack of electrically insulated annular core laminations and one or more supporting bearing plates with external radial winding slots, a layer of thermoplastic adhesive material interposed between adjacent laminations and between said laminations and said plates constituting means for securing said laminations and plates together without substantially impairing their insulation to form a unitary core structure, a polyphase distributed energizing winding disposed in said external slots, a magnetic yoke disposed about said core structure and said winding, a supporting bearing mounted from and supported solely by each plate, and a cooperating smooth cylindrical rotor disposed within the bore of said core structure and supported in said bearings and constructed at least in part of a magnetic material having a high hysteretic constant.

12. A self-starting hysteresis synchronous motor comprising a stack of electrically insulated annular core laminations and a pair of supporting bearing plates with external radial winding slots, a layer of thermoplastic adhesive material interposed between adjacent laminations and between said laminations and said plates constituting the sole means for securing said laminations and plates together without substantially impairing their insulation to form a unitary core structure, a polyphase distributed energizing winding disposed in said external slots, a magnetic yoke disposed about said core structure and said winding, a supporting bearing mounted from and supported solely by each plate, and a cooperating rotor disposed within the bore of said core structure and supported in said bearings and including a non-magnetic central portion and a surrounding annular shell of an aluminum-nickel-cobalt alloy.

13. In an hysteresis dynamo electric machine, a wound stator having an uninterrupted cylindrical wall, a rotor comprising an annulus of ferro-magnetic material of high coercivity and support means mounting said annulus for rotation, the surface of said annulus adjacent said stator and the surface of said uninterrupted cylindrical stator wall being as close together as machine tolerances permit, said support means for said annulus being of such character that magnetic flux flows circumferentially around said annulus over a segment the length of which is more than twice the radial thickness of said annulus.

14. A hysteresis dynamoelectric machine having co-operating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature constructed at least in part of a magnetic material having a high hysteretic constant, said members having complementary cylindrical adjacent surfaces forming an air gap therebetween and having relative diameters such that said gap is of the order of 0.2 per cent. of the smaller diameter of said complementary cylindrical adjacent surfaces, and means for mounting said members for relative rotation.

15. A hysteresis dynamoelectric machine having co-operating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature constructed at least in part of a magnetic material having a high hysteretic constant, said members having complementary cylindrical adjacent surfaces forming an air gap therebetween and having relative diameters such that said gap is of the order of 0.003 inch, and means for mounting said members for relative rotation.

16. A hysteresis dynamoelectric machine having co-operating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature having an annular shell of material having a high hysteretic constant, said shell having a low circumferential reluctance relative to all other paths through and around said rotor causing substantially all of the stator magnetic flux to flow circumferentially therearound, said members having complementary cylindrical adjacent surfaces forming an air gap therebetween and having such relative diameters that said air gap is of the order of 0.2 per cent. of the smaller of said diameters, and means for mounting said members for relative rotation.

17. A hysteresis dynamoelectric machine having co-operating stator and rotor members, one of said members comprising a magnetic core structure having a low conductivity to eddy currents and having a series of radially extending, angularly spaced winding slots and magnetic bridges for the ends thereof adjacent the other member and a polyphase distributed energizing winding disposed in said slots, the other of said members comprising a magnetic armature having an annular shell of material having a high hysteretic constant, said shell having a low circumferential reluctance relative to all other paths through and around said rotor causing substantially all of the stator magnetic flux to flow circumferentially therearound, said members having complementary cylindrical adjacent surfaces forming an air gap therebetween and having such relative diameters that said air gap is of the order of 0.003 inch, and means for mounting said members for relative rotation.

HERBERT C. ROTERS.

REFERENCES CITED

The following references are of record in the file of this patent:

UNITED STATES PATENTS

| Number | Name | Date |
|---|---|---|
| 1,538,196 | Livingston | May 19, 1925 |
| 1,884,140 | Nickle | Oct. 25, 1932 |
| 1,978,100 | Buerke | Oct. 23, 1934 |
| 2,039,456 | Sammarone | May 5, 1936 |
| 2,057,503 | Sawyer | Oct. 13, 1936 |
| 2,183,404 | Morrill | Dec. 12, 1939 |
| 2,303,291 | Moss | Nov. 24, 1942 |
| 2,328,743 | Roters | Sept. 7, 1943 |
| 2,423,345 | Roters | July 1, 1947 |
| 2,423,869 | Blessing | July 15, 1947 |

FOREIGN PATENTS

| Number | Country | Date |
|---|---|---|
| 525,092 | Great Britain | Aug. 21, 1940 |
| 537,833 | Great Britain | July 8, 1941 |
| 458,671 | Great Britain | Dec. 18, 1936 |
| 576,243 | Great Britain | Mar. 26, 1946 |